United States Patent
Venkatesan et al.

(10) Patent No.: US 8,233,502 B2
(45) Date of Patent: Jul. 31, 2012

(54) SYSTEM AND METHOD FOR HEURISTICALLY DROPPING PACKETS IN A MULTILINK PPP BUNDLE

(75) Inventors: Sivakumar Venkatesan, Sunnyvale, CA (US); Ramakanth Gunuganti, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 795 days.

(21) Appl. No.: 12/016,852

(22) Filed: Jan. 18, 2008

(65) Prior Publication Data

US 2009/0185560 A1 Jul. 23, 2009

(51) Int. Cl.
  *H04L 12/28* (2006.01)
  *H04J 3/24* (2006.01)
  *H04J 3/00* (2006.01)
  *H04J 3/04* (2006.01)

(52) U.S. Cl. ......... 370/474; 370/389; 370/476; 370/536

(58) Field of Classification Search .................. None
  See application file for complete search history.

(56) References Cited

U.S. PATENT DOCUMENTS

| | | | | |
|---|---|---|---|---|
| 6,519,223 B1 * | 2/2003 | Wager et al. | ................. | 370/216 |
| 2003/0031185 A1 * | 2/2003 | Kikuchi et al. | ............... | 370/400 |
| 2003/0174700 A1 * | 9/2003 | Ofek et al. | .................... | 370/389 |
| 2004/0260829 A1 * | 12/2004 | Husak et al. | .................. | 709/232 |
| 2008/0225847 A1 * | 9/2008 | Manjunatha et al. | ......... | 370/389 |

OTHER PUBLICATIONS

K. Sklower; B. Lloyd; G. McGregor; D. Carr; T. Coradetti, Network Working Group, Request for Comments: 1990, "The PPP Multilink Protocol (MP)", Aug. 1996.*
K. Sklower; B. Lloyd; G. McGregor; D. Carr; Network Working Group, Request for Comments: 1717, "The PPP Multilink Protocol (MP)", Nov. 1994.

* cited by examiner

*Primary Examiner* — Anh-Vu H Ly
*Assistant Examiner* — Thinh Tran
(74) *Attorney, Agent, or Firm* — Shumaker & Sieffert, P.A.

(57) ABSTRACT

Systems and methods consistent with the present invention provide a better fragment drop heuristic that determines a per-fragment determined "remainder time" value to trigger potential drops on the whole bundle. A per-bundle drop timeout value is assumed. This value is to be configured based on differential delay considerations of the various links that constitute the bundle. The arrival time of a fragment to a reassembly algorithm triggers a remainder timer. When the reassembly algorithm instance actually processes the fragment, the "remainder time," which is difference of a bundle drop timeout and time elapsed on the remainder timer, is used to determine whether the fragment and the other fragments of the packet should be dropped.

20 Claims, 5 Drawing Sheets

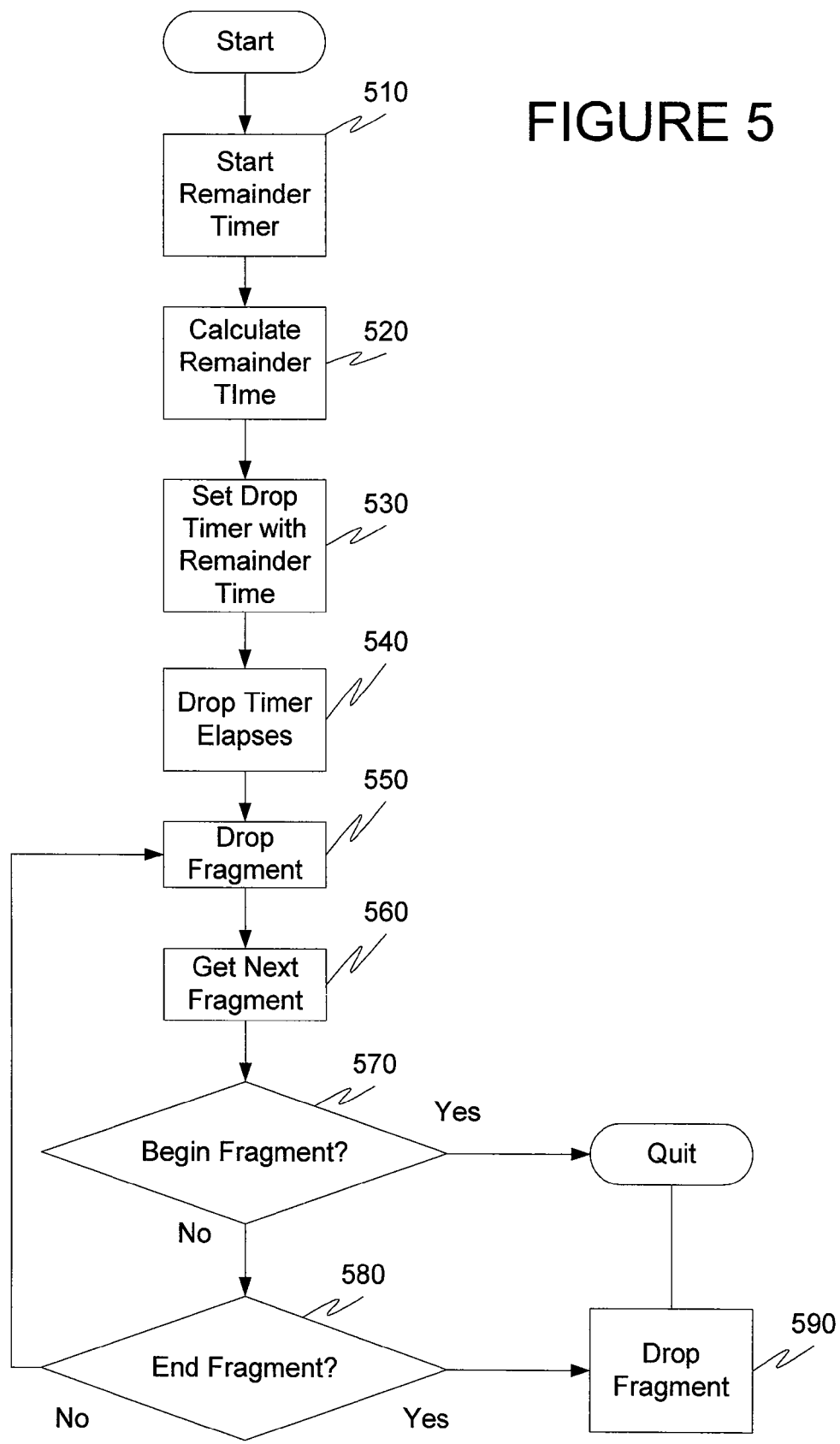

SYSTEM AND METHOD FOR HEURISTICALLY DROPPING PACKETS IN A MULTILINK PPP BUNDLE

FIELD OF THE INVENTION

The present invention generally relates to network routing, and relates more particularly to determining whether a packet should be dropped in a multilink point-to-point protocol (PPP) bundle.

BACKGROUND

Modern data communications utilize a variety of different forms of packet communications. Within a packet network, many of the links are point-to-point links between peer nodes. When a need for increased bandwidth on such a link arises, one option is to replace the existing link with a higher bandwidth link. However, this approach often is prohibitively expensive, particularly as an incremental upgrade. Accordingly, the solution to providing increased bandwidth often entails deploying one or more new links of similar or somewhat higher capacity in parallel to the existing link between the nodes forming the two end points. Such an upgrade forms a multilink bundle, with an aggregate bandwidth that is essentially the sum of the bandwidths or throughput rates of the parallel links in the bundle.

The multilink bundle does offer increased capacity, however, its use presents certain problems. To effectively utilize the links in the bundle as an aggregate requires that the bundle effectively appear as a single interface to each end-point node. At one logical level, traffic intended for transport through this interface must appear as a single, unified data stream. However, within the bundle, it is necessary to segregate the traffic and distribute segments of traffic to the different links.

To maximize utilization of the parallel links within a multilink bundle, the packet communication load on the two or more parallel links are "balanced," that is to say the volume of packet data traffic through the bundle must be optimally distributed between the various parallel links. A number of known algorithms are used to select which link to use to transport the various packets between the end-points and thereby balance the load on the links.

One type of approach manages the packet routing over the links based on link utilization. For example, when traffic on a first link reaches a certain level, the sending node shifts further packet traffic over to the next parallel link. This approach tends to load one link first, then another, and so on. Another general class of load-balancing techniques evenly distributes packets across all the links regardless of the current level of utilization of any particular link. This later approach reduces packet latency. Within this class, there are a number of specific approaches to load balancing.

Many point-to-point links today use PPP, the Point-to-Point Protocol. The Multilink Protocol (RFC 1717) is a standardized extension of the PPP, which enables combination of PPP links or channels into a 'Multilink bundle' for higher rate point-to-point communications. The Multilink Protocol (MLP) uses packet fragmentation and a round-robin link assignment technique to distribute portions of data traffic over the various links within a bundle.

A typical load-balancing situation using the Multilink Protocol involves a point-to-point bundle of links between two peers, for example, between two routers. A common implementation may use multiple ISDN links between the nodes, for example basic rate or primary rate (T1) ISDN connections. A router at one end of the bundle separates a long Internet Protocol (IP) packet into two or more fragments and adds an MLP sequence header to each fragment. The load-balancing algorithm distributes the fragments taken from each packet over an appropriate number of the links, to allow parallel transmission through the bundle. In this manner, packets from a particular flow actually utilize any or all of the links in the bundle.

The communications over parallel links may encounter different delays in transmission. Fragments of one packet or succeeding packets may arrive at the receiver in a different order than when sent out over the multilink bundle. The PPP Multilink Protocol therefore uses packet sequencing to order fragments and packets. Specifically, a sequence number included in the header of each fragment of a packet allows the receiver to properly reorder the fragments and packets as they arrive over different links in the bundle. The use of the sequence numbers, the differences in transit time through the links and the subsequent reordering all add delay and processing time. A goal is to make the bundle appear as a single point-to-point interface. In this regard it would be preferable to avoid reordering if possible.

The Multilink Protocol also provides for transport of two classes of packets, packets with sequence numbers and packets without sequence numbers. It is possible to expedite communication of a packet through the bundle by omitting the sequence number.

During fragment reassembly, it may be discovered that one of the fragments is missing. Accordingly, the packet has been corrupted and all of the fragments of that packet should be dropped. Multilink PPP fragment reassembly algorithms depend on heuristic measures to aid in dropping fragments received on a link when others that are part of the whole packet do not arrive in time on one or more of the constituent links. In order to better guarantee latency of re-assembled packets, it is best to devise as good a set of heuristics as possible that will detect a fragment to be dropped as early as possible as permitted by the differential-delay constraints on the constituent links.

RFC 1990 "The PPP Multilink Protocol (MP)," (hereby incorporated herein) suggests one heuristic to detect fragment loss on a Multilink PPP bundle. The heuristic detects fragment loss based on the assumption that either a fragment with (E)nd bit that is part of an incomplete packet is present or a fragment with (B)egin bit following an incomplete packet is present. If neither of these conditions match for a sequence of one or more packets, such packet loss will not be detected. Additionally, this mechanism does not suffice by itself to sustain fast packet rates in tandem with finite buffering per bundle.

SUMMARY

Systems and methods consistent with the present invention provide a better fragment drop heuristic that determines a per-fragment determined "remainder time" value to trigger potential drops on the whole bundle. A drop timeout value is selected based on differential delay considerations of the various links that constitute the bundle. The arrival time of a fragment to a reassembly algorithm instance is recorded. When the reassembly algorithm instance actually processes the fragment, the "remainder time," which is difference of a bundle drop timeout and time elapsed since the fragment's arrival, is used to determine whether the fragment and the other fragments of the packet should be dropped. Thus, this heuristic detects more dropped fragments than the conventional methods.

An embodiment consistent with methods and systems in accordance with the present invention is directed to method for determining a fragment drop in a fragment stream received over a multilink point-to-point protocol bundle. The method includes the steps of receiving a fragment of a packet, starting a remainder timer, processing the packet for reassembly, at the time of processing, determining the elapsed time on the remainder timer, calculating a drop time by subtracting the elapsed time from a timeout value, waiting for the drop time to elapse and dropping the fragment. The embodiment may further include the steps of a) selecting the sequence number of the fragment as a start number, b) incrementing the start number, c) dropping a next fragment having a sequence number equal to the start number, d) repeating steps a-c until the next fragment is one of a begin fragment and a end fragment. If the next fragment is an end fragment, steps a-c are ceased, and if the next fragment is an end fragment, the next fragment is dropped and steps a-c are ceased. The timeout value may be selected based on characteristics of the multilink point-to-point protocol bundle, or based on characteristics of a packet class. The packet class may be a high priority class, a low latency class, or a best efforts class. The method may be performed in a router.

Another embodiment consistent with methods and systems in accordance with the present invention is directed to a computer-readable medium storing computer executable instructions for determining a fragment drop in a fragment stream received over a multilink point-to-point protocol bundle. The method includes the steps of receiving a fragment of a packet, starting a remainder timer, processing the packet for reassembly, at the time of processing, determining the elapsed time on the remainder timer, calculating a drop time by subtracting the elapsed time from a timeout value, waiting for the drop time to elapse and dropping the fragment. The embodiment may further include the steps of a) selecting the sequence number of the fragment as a start number, b) incrementing the start number, c) dropping a next fragment having a sequence number equal to the start number, d) repeating steps a-c until the next fragment is one of a begin fragment and a end fragment. If the next fragment is an end fragment, steps a-c are ceased, and if the next fragment is an end fragment, the next fragment is dropped and steps a-c are ceased. The timeout value may be selected based on characteristics of the multilink point-to-point protocol bundle, or based on characteristics of a packet class. The packet class may be a high priority class, a low latency class, or a best efforts class. The method may be performed in a router.

Another embodiment consistent with methods and systems in accordance with the present invention is directed to router comprising a memory including a program for receiving fragment of a packet, starting a remainder timer, processing the packet for reassembly, at the time of processing, determining the elapsed time on the remainder timer, calculating a drop time by subtracting the elapsed time from a timeout value, waiting for the drop time to elapse, and dropping the fragment, and a processor executing the program.

Other systems, methods, features, and advantages consistent with the present invention will become apparent to one with skill in the art upon examination of the following figures and detailed description. It is intended that such additional systems, methods, features, and advantages be included within this description and be within the scope of the invention.

BRIEF DESCRIPTION OF THE DRAWINGS

The accompanying drawings, which are incorporated in and constitute a part of this specification, illustrate an implementation of methods and systems consistent with the present invention and, together with the description, serve to explain advantages and principles consistent with the invention. In the drawings.

FIG. 5 illustrates a method for determining packet drops consistent with methods and systems consistent with the present invention.

DETAILED DESCRIPTION

Figure 1:
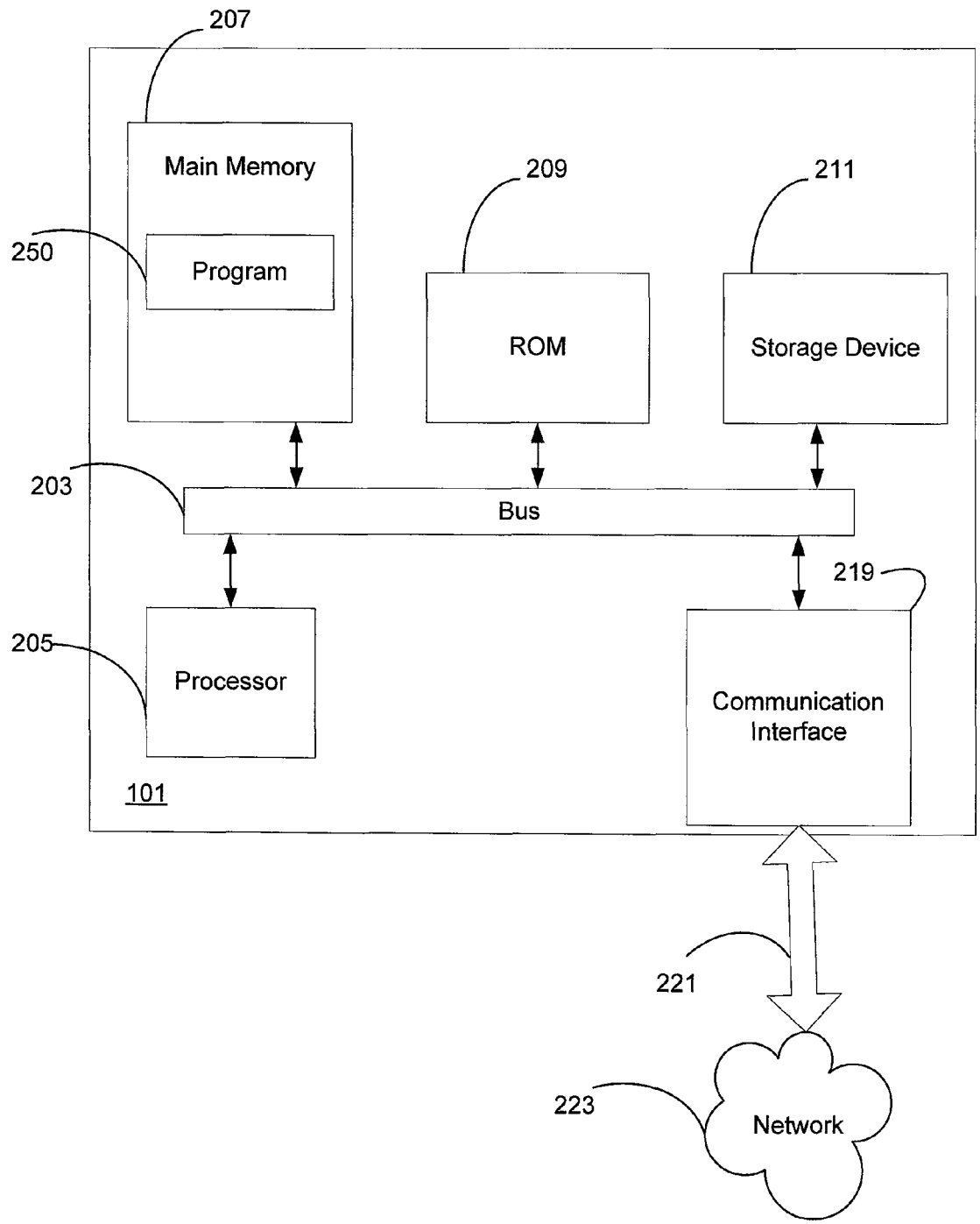
FIG. 1 illustrates an exemplary router in which methods and systems consistent with the present invention may be implemented.

FIG. 1 illustrates an exemplary router 101 consistent with systems and methods consistent with the present invention. Router 101 includes a bus 203 or other communication mechanism for communicating information, and a processor 205 coupled with bus 203 for processing the information. Router 101 also includes a main memory 207, such as a random access memory (RAM) or other dynamic storage device, coupled to bus 203 for storing information and instructions to be executed by processor 205. In addition, main memory 207 may be used for storing temporary variables or other intermediate information during execution of instructions to be executed by processor 205. Main memory 207 includes a program 250 for determining packet drops consistent with methods and systems consistent with the present invention, described below. Router 101 further includes a read only memory (ROM) 209 or other static storage device coupled to bus 203 for storing static information and instructions for processor 205. A storage device 211, such as a magnetic disk or optical disk, is provided and coupled to bus 203 for storing information and instructions.

According to one embodiment, processor 205 executes one or more sequences of one or more instructions contained in main memory 207. Such instructions may be read into main memory 207 from another computer-readable medium, such as storage device 211. Execution of the sequences of instructions in main memory 207 causes processor 205 to perform the process steps described herein. One or more processors in a multi-processing arrangement may also be employed to execute the sequences of instructions contained in main memory 207. In alternative embodiments, hard-wired circuitry may be used in place of or in combination with software instructions. Thus, embodiments are not limited to any specific combination of hardware circuitry and software.

Although described relative to main memory 207 and storage device 211, instructions and other aspects of methods and systems consistent with the present invention may reside on another computer-readable medium, such as a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Router 101 also includes a communication interface 219 coupled to bus 203. Communication interface 219 provides a two-way data communication coupling to a network link 221 that is connected to a local network 223. Wireless links may also be implemented. In any such implementation, communication interface 219 sends and receives signals that carry digital data streams representing various types of information.

Figure 2:
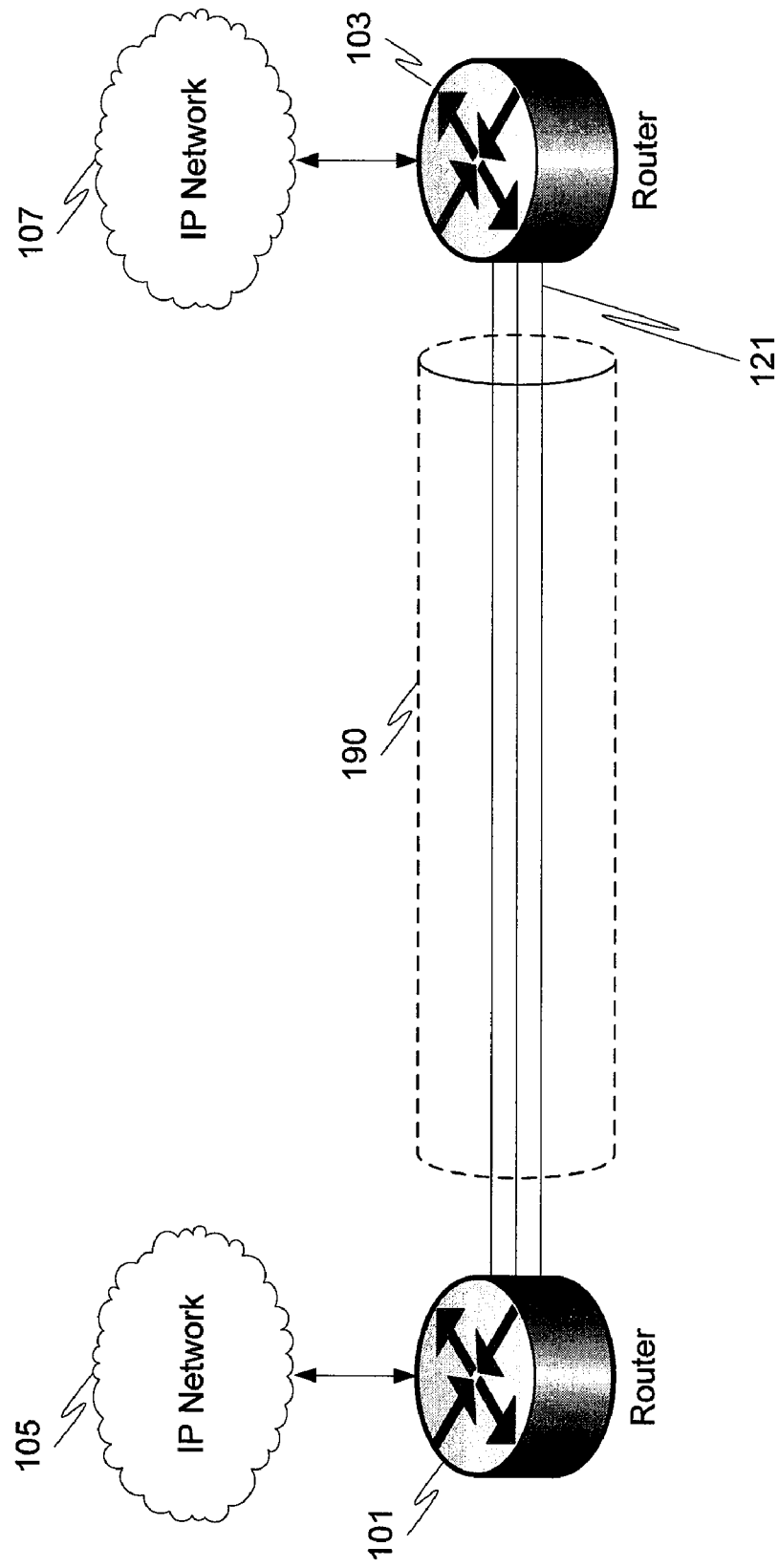
FIG. 2 illustrates a multilink PPP bundle consistent with methods and systems consistent with the present invention.

Consider a typical implementation of a multilink bundle. As shown in the example of FIG. 2, a first router 101 conducts peer-to-peer communications with a second router 103. Each router 101 and 103 provides two-way IP packet communication services for one or more devices (not shown) that are coupled to the respective router through some form of IP network, shown generically as clouds 105, 107. Although other protocols may be used, in one embodiment consistent with methods and systems consistent with the present invention, the routers utilize point to point protocol (PPP) to transport IP packets over a bundle 190 comprising two or more parallel links or channels 121.

The links 121 in the bundle 190 may be physical links of the same or different bandwidth extending in parallel between the two peers, in the example between the two routers 101, 103. For example, a bundle of three links may include three primary rate interface (PRI) ISDN links or the equivalent three T1 lines. Alternatively, two or more of the links 121 may be logical channels carried over the same physical link, such as two B-channels of a basic rate interface (BRI) ISDN line.

Figure 3:
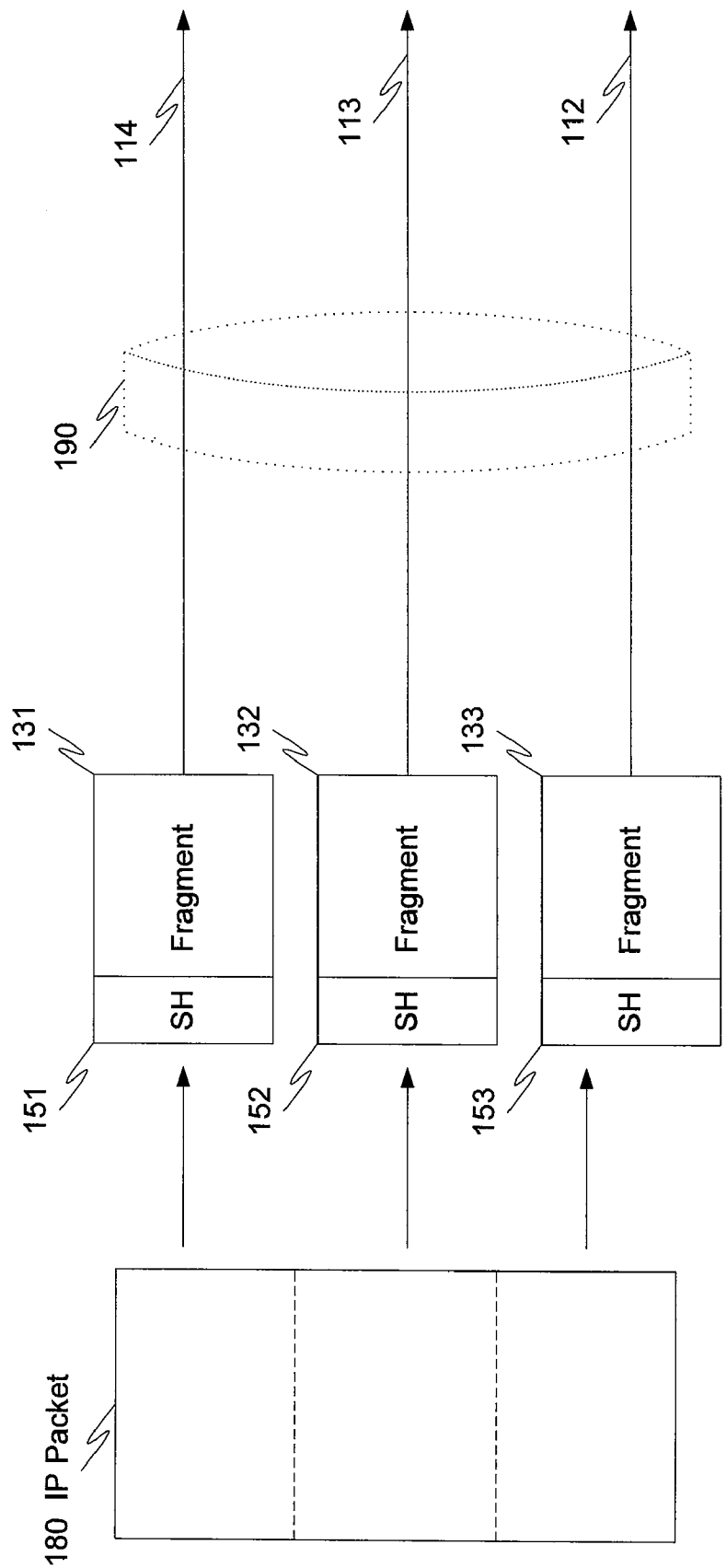
FIG. 3 illustrates packet fragmentation consistent with methods and systems consistent with the present invention.

The routers utilize the Multilink Protocol for PPP to aggregate the bandwidth of the individual links 121 so that the bundle appears as a unified logical interface for IP communications between the routers 101, 103. The router processing for communication over this bundle 190 takes maximum advantage of the fragmentation and interleaving capabilities of the Multilink Protocol. In the Multilink Protocol, large packets are broken up into multiple segments or "fragments" sized appropriately for the multiple physical links. To illustrate this point, FIG. 3 shows a large IP packet 180. For purposes of this discussion, assume that the packet 180 relates to a communication receiving best-efforts service from the routers 101, 103, for example for an FTP or HTTP transmission. The router 101 may receive the packet 180 from a device coupled to IP network 105. The packet includes a destination address associated with a device on IP network 107, and the router 101 must forward the packet over the bundle 190 to the router 103.

In this example, the router 101 breaks the large IP packet 180 into a series of fragments, shown for example as the three fragments 131, 132, 133. The fragments may have the same size if the links have similar bandwidths or bit-rates; or the fragments may be sized to correspond to differences in the capacities of the links. A Multilink PPP sequence header (SH) is inserted before each section. The first fragment of a multilink packet in PPP, for example, will have two headers, one for the fragment followed by the IP header for the packet itself. In the example, the sequence header 151 is added to the fragment 131, the sequence header 152 is added to the fragment 132, and the sequence header 153 is added to the fragment 133.

Each sequence header SH includes the Multilink Protocol Identifier. Typically, Multilink PPP fragments are encapsulated using the protocol identifier 0x00-0x3d. Following the protocol identifier, the sequence header includes the actual Multilink header, which is a four-byte header containing a sequence number, and two one bit fields indicating that the fragment begins a packet or terminates a packet. After negotiation of an additional PPP Link Control Protocol (LCP) option, a two-byte header with only a 12-bit sequence space may optionally replace the four-byte header.

In the example shown, the bundle 190 includes three links, 112, 113, and 114. The router maintains a separate queue for each link, and assigns each new fragment to one of the queues in such a manner as to distribute traffic over all of the links 121 in a balanced manner, typically using a round-robin assignment algorithm. In the example, the fragment 131 and its header 151 are queued-up for transmission over the link 114, the fragment 132 and its header 152 are queued-up for transmission over the link 113, and the fragment 133 and its header 153 are queued-up for transmission over the link 112.

The fragmentation allows parallel transmission of the segments of the large packets over any two or more of the parallel links. As such, a best effort communication may use any or all of the bandwidth of any or all of the links 121 in the bundle 190. The traffic load generated by such packets is evenly distributed over the links. If differential delays on the links cause fragments to arrive out of order, the receiver (in router 103 in this example) can utilize the sequence numbers to reorder the fragments as needed to reconstruct the original IP packet 180 before further transmission thereof over the IP network 107.

Figure 4:
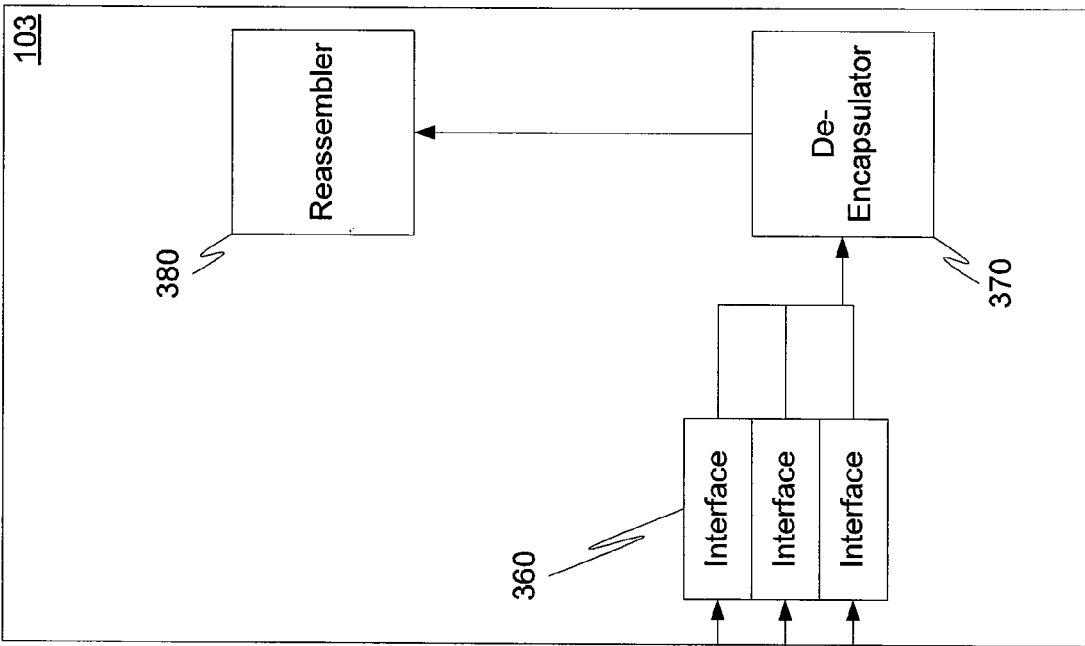
FIG. 4 illustrates a system for transmitting packets over a multilink PPP bundle consistent with methods and systems consistent with the present invention.
Figure 4:
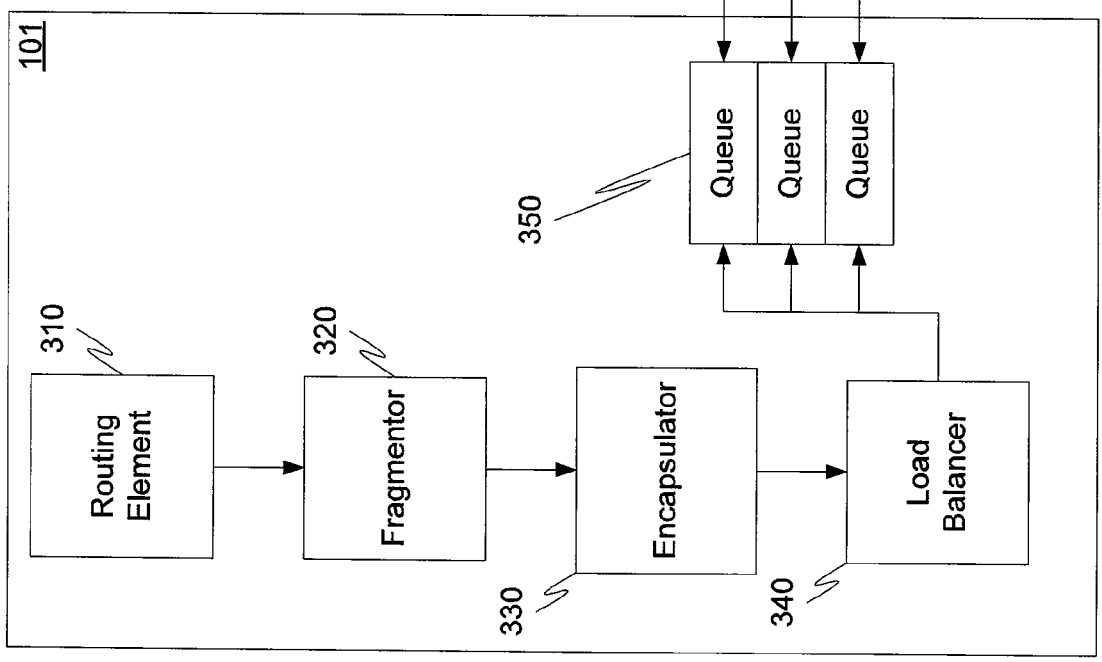

FIG. 4 is a block diagram of the logical processing elements within the routers, as they send packets over the links of the bundle 190. The blocks illustrated in the drawing may be implemented with any appropriate combination of hardware and software. The sending router 101 includes one or more routing elements 310 for receiving IP packets from other network links and performing a routing function. When the IP packet processing indicates a need to transmit a packet via the bundle 190, the routing element 310 supplies the packet to a fragmentor 320 for packet fragmentation. The fragmentor 320 fragments packets larger than a predetermined size into smaller portions or fragments. The maximum fragment size essentially corresponds to the smallest bandwidth of any of the links in the bundle times the maximum delay for communication of a fragment over a link in the bundle. The fragmentor 320 supplies the fragments of each packet to encapsulator 330, which performs the function of MLP (Multilink PPP) encapsulation. As part of this encapsulation, this encapsulator 330 assigns a sequence number to each fragment and adds the sequence number header to each fragment, as outlined above relative to FIG. 3.

The encapsulated fragments are then processed through a load-balancing algorithm by load balancer 340. The load-balancing algorithm used by load balancer 340 distributes the fragments to queues 350 to await transmission through bundle 190.

The receiving router 103 includes multiple interfaces 360, to the various links of the bundle 190. Each interface 360 receives a series of packets and fragments from the transmitter interface in the router or other node associated with the opposite end of the multilink bundle 190. The interfaces 360 supply the packets and fragments to a packet de-encapsulator 370, which de-encapsulates the packet fragments consistent with MLP. The de-encapsulator 370 supplies the packet fragments to a reassembler 380 for a reassembly operation to reconstruct the original IP packets from the fragments. During reassembly, reassembler 380 determines whether any fragments of a packet were lost, and if so, drops the fragments associated with that packet. This method is described with reference to FIG. 5.

FIG. 5 illustrates a method for determining packet drops consistent with methods and systems consistent with the present invention. When a fragment arrives at interfaces 360, a remainder timer is started (Step 510). When the reassembler 380 reaches the fragment during reassembly, a remainder time is calculated by subtracting the elapsed time on the remainder timer from a bundle timeout value (Step 520). The bundle timeout value is selected based on acceptable latency condition and the various links that constitute the bundle. The reassembler 380 then uses the remainder time value to set a drop timer (Step 530). When the drop timer elapses and the fragment has not been reassembled (Step 540), the reassembler 380 drops the fragment (Step 550) and begins walking a fragment chain starting with the sequence number of that packet (Step 560). A fragment chain is the remaining fragments of the packet as indicated by a fragment with an "End" bit, or alternatively if that fragment is missing, a fragment with a "Begin" bit. The fragment chain includes packet fragments with sequentially increasing numbers, and the chain may be followed by incrementing a sequence number corresponding to a packet fragment to process. If the next fragment has the "Begin" bit flagged (Step 570), the reassembler 380 ceases because it has passed the end of the fragment chain. If the next fragment has the "End" bit (Step 580), the fragment is dropped and the reassembler 380 ceases because it is at the end of the fragment chain (Step 590). Otherwise, the reassembler 380 moves on to the next fragment (Step 560).

In another embodiment consistent with methods and systems consistent with the present invention, the timeout value is based on specific packet classes. For example, a high priority packet might have a timeout value that is greater than a low latency packet, which would have a timeout value greater than a best efforts class packet. A high priority packet fragment should be processed if possible. A low latency packet fragment should be processed if possible within the amount of time where the packet fragment is still relevant. After too much time, a delay-sensitive packet (low latency) is useless. Best efforts packet fragments should be processed within an acceptable amount of time, but dropped if they begin to hold up traffic.

While there has been illustrated and described embodiments consistent with the present invention, it will be understood by those skilled in the art that various changes and modifications may be made and equivalents may be substituted for elements thereof without departing from the true scope of the invention. Therefore, it is intended that this invention not be limited to any particular embodiment disclosed, but that the invention will include all embodiments falling within the scope of the appended claims.

What is claimed is:

1. A method for determining a fragment drop in a fragment stream received over a multilink point-to-point protocol bundle, the method comprising the steps of:
   receiving a fragment of a packet over a multilink point-to-point protocol bundle;
   starting a remainder timer;
   processing the packet for reassembly;
   at the time of processing, determining the elapsed time on the remainder timer;
   calculating a drop time by subtracting the elapsed time from a bundle timeout value, wherein the bundle timeout value is based on an acceptable latency condition and on links that constitute the bundle;
   waiting for the drop time to elapse;
   dropping the fragment; and
   ceasing reassembly of the packet.

2. The method of claim 1, further comprising:
   a) selecting the sequence number of the fragment as a start number;
   b) incrementing the start number;
   c) dropping a next fragment having a sequence number equal to the start number;
   d) repeating steps a-c until the next fragment is one of a begin fragment or a end fragment.

3. The method of claim 2, wherein if the next fragment is an begin fragment, steps a-c are ceased.

4. The method of claim 3, wherein if the next fragment is an end fragment, the end fragment is dropped and steps a-c are ceased.

5. The method of claim 1, wherein the timeout value is selected based on characteristics of the multilink point-to-point protocol bundle.

6. The method of claim 1, wherein the timeout value is selected based on characteristics of a packet class.

7. The method of claim 6, wherein the packet class is a high priority class.

8. The method of claim 6, wherein the packet class is a low latency class.

9. The method of claim 6, wherein the packet class is a best efforts class.

10. The method of claim 1, wherein the method is performed in a router.

11. A non-transitory computer-readable medium storing computer executable instructions for determining a fragment drop in a fragment stream received over a multilink point-to-point protocol bundle, the method including the steps of:
    receiving a fragment of a packet over a multilink point-to-point protocol bundle;
    starting a remainder timer;
    processing the packet for reassembly;
    at the time of processing, determining the elapsed time on the remainder timer;
    calculating a drop time by subtracting the elapsed time from a bundle timeout value, wherein the bundle timeout value is based on an acceptable latency condition and on various links that constitute the bundle;
    waiting for the drop time to elapse;
    dropping the fragment; and
    ceasing reassembly of the packet.

12. The non-transitory computer-readable medium of claim 11, further comprising:
    a) selecting the sequence number of the fragment as a start number;
    b) incrementing the start number;
    c) dropping a next fragment having a sequence number equal to the start number;
    d) repeating steps a-c until the next fragment is one of a begin fragment or a end fragment.

13. The non-transitory computer-readable medium of claim 12, wherein if the next fragment is an begin fragment, steps a-c are ceased.

14. The non-transitory computer-readable medium of claim 12, wherein if the next fragment is an end fragment, the end fragment is dropped and steps a-c are ceased.

15. The non-transitory computer-readable medium of claim 11, wherein the timeout value is selected based on characteristics of the multilink point-to-point protocol bundle.

16. The non-transitory computer-readable medium of claim 11, wherein the timeout value is selected based on characteristics of a packet class.

17. The non-transitory computer-readable medium of claim 16, wherein the packet class is a high priority class.

18. The non-transitory computer-readable medium of claim 16, wherein the packet class is a low latency class.

19. The non-transitory computer-readable medium of claim 16, wherein the packet class is a best efforts class.

20. A router comprising:
    a memory including a program for receiving fragment of a packet over a multilink point-to-point protocol bundle, starting a remainder timer, processing the packet for reassembly, at the time of processing, determining the elapsed time on the remainder timer, calculating a drop time by subtracting the elapsed time from a bundle timeout value, wherein the bundle timeout value is based on an acceptable latency condition and on various links that constitute the bundle, waiting for the drop time to elapse, and dropping the fragment; ceasing reassembly of the packet; and
    a processor executing the program.

* * * * *